(12) United States Patent
Sekiguchi et al.

(10) Patent No.: US 10,828,854 B2
(45) Date of Patent: Nov. 10, 2020

(54) PUNCTURE REPAIR LIQUID HOLDING CONTAINER

(71) Applicant: The Yokohama Rubber Co., LTD., Minato-ku, Tokyo (JP)

(72) Inventors: Takumi Sekiguchi, Hiratsuka (JP); Daisuke Kanenari, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 123 days.

(21) Appl. No.: 15/763,823

(22) PCT Filed: Sep. 12, 2016

(86) PCT No.: PCT/JP2016/076845
§ 371 (c)(1),
(2) Date: Mar. 27, 2018

(87) PCT Pub. No.: WO2017/056951
PCT Pub. Date: Apr. 6, 2017

(65) Prior Publication Data
US 2018/0281323 A1    Oct. 4, 2018

(30) Foreign Application Priority Data

Sep. 29, 2015 (JP) ................................ 2015-191785

(51) Int. Cl.
*B29C 73/24* (2006.01)
*B29C 73/16* (2006.01)
(Continued)

(52) U.S. Cl.
CPC .............. *B29C 73/24* (2013.01); *B29C 73/02* (2013.01); *B29C 73/166* (2013.01);
(Continued)

(58) Field of Classification Search
CPC ........ B29C 73/24; B29C 73/02; B29C 73/166; B65D 23/0842; B65D 23/14;
(Continued)

(56) References Cited

U.S. PATENT DOCUMENTS 2,912,018 A * 11/1959 Leech ................. B01F 3/04787
141/18
5,217,307 A * 6/1993 McClintock ........... B65D 33/34
206/831
(Continued)

FOREIGN PATENT DOCUMENTS

JP    2010-094944    4/2010
JP    2010-270878    12/2010
(Continued)

OTHER PUBLICATIONS

International Search Report for International Application No. PCT/JP2016/076845 dated Nov. 15, 2016, 2 pages, Japan.

*Primary Examiner* — Ernesto A Grano
(74) *Attorney, Agent, or Firm* — Thorpe North & Western

(57) ABSTRACT

A puncture repair liquid holding container includes a container main body provided with a holding portion that holds a puncture repair liquid and an opening, a cap mounted on the opening, and a reinforcing member made from a material having a tensile elastic modulus per unit cross-sectional area greater than that of a material constituting the holding portion. The reinforcing member is disposed around an entire circumference of the holding portion over at least a portion of the holding portion in a height direction.

11 Claims, 5 Drawing Sheets

(51) Int. Cl.
  *B29C 73/02*  (2006.01)
  *B65D 23/08*  (2006.01)
  *B65D 23/14*  (2006.01)
  *B29L 30/00*  (2006.01)

(52) U.S. Cl.
  CPC ......... B65D 23/0842 (2013.01); B65D 23/14 (2013.01); *B29L 2030/00* (2013.01)

(58) Field of Classification Search
  CPC .. B65D 23/085; B65D 25/36; B65D 2203/02; B29L 2030/00
  USPC ...................................................... 206/459.5
  See application file for complete search history.

(56) References Cited

U.S. PATENT DOCUMENTS

| | | | | |
|---|---|---|---|---|
| 6,506,464 B1* | 1/2003 | Montenieri | ......... | B29C 49/0005 428/36.7 |
| 7,048,132 B2* | 5/2006 | Yamanaka | ........... | B65D 1/0292 215/381 |
| 8,304,073 B2* | 11/2012 | Davies | ................... | B32B 27/32 428/354 |
| 8,517,063 B2* | 8/2013 | Kanenari | .............. | B29C 73/166 141/105 |
| 2002/0119221 A1* | 8/2002 | Matsukura | ............... | A23G 9/28 426/115 |
| 2004/0031802 A1* | 2/2004 | Parodi | ..................... | B65D 1/44 220/669 |
| 2005/0218140 A1* | 10/2005 | Enoki | ...................... | B65D 7/04 220/62.22 |
| 2006/0117909 A1* | 6/2006 | Hsu | ....................... | B29C 73/025 81/15.6 |
| 2009/0200243 A1* | 8/2009 | Iwasaki | ................. | B29C 73/166 210/729 |
| 2009/0277862 A1* | 11/2009 | Masuda | ............. | B65D 41/0442 215/329 |
| 2011/0174769 A1* | 7/2011 | Jung, II | ............... | B65D 1/0246 215/383 |
| 2011/0192492 A1 | 8/2011 | Kanenari et al. | | |
| 2012/0037267 A1* | 2/2012 | Senno | .................... | B29C 73/166 141/38 |
| 2012/0104663 A1* | 5/2012 | Ogata | ............... | B29C 45/14336 264/509 |
| 2012/0312387 A1* | 12/2012 | Sekiguchi | ............... | B29C 73/02 137/15.04 |
| 2013/0146594 A1* | 6/2013 | Hirano | .................... | C23C 28/00 220/62.17 |
| 2013/0337278 A1* | 12/2013 | Ishikawa | .............. | B65D 23/0878 428/483 |
| 2014/0248449 A1* | 9/2014 | Sasaki | ...................... | C09D 1/00 428/34.3 |
| 2014/0299566 A1* | 10/2014 | Takatomi | ............... | B21D 51/26 215/12.2 |
| 2014/0373974 A1* | 12/2014 | Ragan | ................... | B29C 73/166 141/114 |
| 2015/0158620 A1 | 6/2015 | Sekiguchi et al. | | |
| 2015/0343723 A1* | 12/2015 | Takahara | .............. | B29C 73/166 141/38 |
| 2015/0343724 A1* | 12/2015 | Takahara | .............. | B29C 73/166 141/38 |
| 2015/0367614 A1* | 12/2015 | Sasaki | .................. | C09D 143/02 428/522 |
| 2016/0279908 A1* | 9/2016 | Banno | ..................... | B32B 27/08 |
| 2017/0190158 A1* | 7/2017 | Ishikawa | ................. | B32B 27/30 |
| 2017/0219165 A1* | 8/2017 | Takemoto | ................. | F17C 1/06 |
| 2017/0232709 A1* | 8/2017 | Inubushi | ............... | B32B 37/153 428/461 |
| 2017/0320626 A1* | 11/2017 | Park | ...................... | B65D 85/18 |
| 2019/0055043 A1* | 2/2019 | Matsunaga | ............. | B65B 53/00 |
| 2019/0283918 A1* | 9/2019 | Barel | ..................... | B65D 25/36 |

FOREIGN PATENT DOCUMENTS

| | | |
|---|---|---|
| JP | 2013-230603 | 11/2013 |
| JP | 2014-046953 | 3/2014 |
| JP | 2014-121863 | 7/2014 |
| WO | WO 2010/047231 | 4/2010 |
| WO | WO 2014/034328 | 3/2014 |

* cited by examiner

PUNCTURE REPAIR LIQUID HOLDING CONTAINER

TECHNICAL FIELD

The present technology relates to a puncture repair liquid holding container, and particularly relates to a puncture repair liquid holding container that decreases a wall thickness of the container and allows a reduction in weight and resource saving while maintaining pressure resistance.

BACKGROUND ART

In recent years, when a tire mounted to a vehicle is punctured, a puncture repair liquid is injected into the tire via the tire valve to temporarily repair the puncture. Examples of a device that allows such a temporary repair include a puncture repair kit. Employing such a puncture repair kit eliminates the need to provide the vehicle with a spare tire, which makes it possible to save resources and reduce the weight of the vehicle. There is also a further advantage that the space in the vehicle where the spare tire would have been provided can be used for other purposes.

Known puncture repair kits include, for example, a so-called pump-type puncture repair kit that injects a puncture repair liquid held in a puncture repair liquid holding container into the tire by compressed air supplied from an air compressor (refer to Japanese Unexamined Patent Application Publication No. 2014-121863, for example). The puncture repair liquid holding container used in such a pump-type puncture repair kit is mainly made from a resin material. The container needs to withstand the pressure of the compressed air supplied from the air compressor. Thus, the puncture repair liquid holding container needs to have a predetermined wall thickness (a sufficient thickness that can withstand the pressure of the compressed air) to stand up to practical usage. This makes it difficult to decrease the wall thickness of the puncture repair liquid holding container in order to further reduce the weight of the vehicle provided with the puncture repair kit using this puncture repair liquid holding container. Further, the need to achieve a sufficient wall thickness makes it difficult to reduce the amount of material constituting the puncture repair liquid holding container and save resources.

SUMMARY

The present technology provides a puncture repair liquid holding container that decreases the wall thickness of the container and allows a reduction in weight and resource saving while maintaining pressure resistance.

A puncture repair liquid holding container according to the present technology includes a container main body provided with a holding portion that holds a puncture repair liquid and an opening, a cap mounted on the opening, and a reinforcing member made from a material having a tensile elastic modulus per unit cross-sectional area greater than that of a material constituting the holding portion. The reinforcing member is disposed around an entire circumference of the holding portion over at least a portion of the holding portion in a height direction.

According to the present technology, the reinforcing member made from a material having a tensile elastic modulus per unit cross-sectional area greater than that of the material constituting the holding portion is disposed around the entire circumference of the holding portion over at least a portion of the holding portion in the height direction as described above, thereby reinforcing the holding portion. As a result, even if the wall thickness is made thinner than that in related art to achieve a reduction in weight and save resources, the container can maintain sufficient pressure resistance as a puncture repair liquid holding container used in a pump-type puncture repair kit.

According to the present technology, preferably the holding portion has a cylindrical shape, and the reinforcing member is disposed so as to cover a range of at least 60% of a height of the holding portion in the height direction of the holding portion from a center position in the height direction of the holding portion. With the reinforcing member thus disposed, it is possible to effectively reinforce the holding portion in a portion that is structurally weakest when the holding portion has a cylindrical shape. Further, such a configuration is effective in maintaining pressure resistance.

According to the present technology, the reinforcing member may have a sheet shape, and the reinforcing member having this sheet shape may be wound around the entire circumference of the holding portion and adhered by an adhesive with both end portions overlapping each other. According to such a configuration, the reinforcing member is easy to install and, with both end portions overlapping, superior reinforcing performance can be achieved. Further, according to such a configuration, since the reinforcing member has a sheet shape, the reinforcing member concurrently can serve as a label that displays puncture repair liquid information and the method of use.

According to the present technology, the reinforcing member may also have an annular shape, and the reinforcing member having this annular shape may be disposed so as surround the holding portion. With such a configuration, it is possible to press the holding portion from the periphery by the structure of the reinforcing member formed in advance into the annular shape, making it possible to achieve superior reinforcing performance against internal pressure.

At this time, the reinforcing member having an annular shape is mounted on the holding portion by the holding portion being inserted inward of the reinforcing member, and thus is preferably fixed after insertion. The reinforcing member therefore preferably further includes an adhesive label adhered so as to extend across at least a portion of the reinforcing member having an annular shape and at least a portion of an outer surface of the holding portion. According to such a configuration, the reinforcing member can be reliably installed in a predetermined position using a simple structure of label adherence. Further, according to such a configuration, the adhesive label may concurrently serve as a label that displays puncture repair liquid information and the method of use.

According to the present technology, the reinforcing member is preferably a resin film stretched in at least a circumferential direction of the holding portion. Such a resin film is inexpensive and exhibits sufficient strength (reinforcing performance), and thus can be preferably used as the reinforcing member.

DETAILED DESCRIPTION

The configuration of the present technology is described in detail below with reference to the accompanying drawings.

Figure 1:
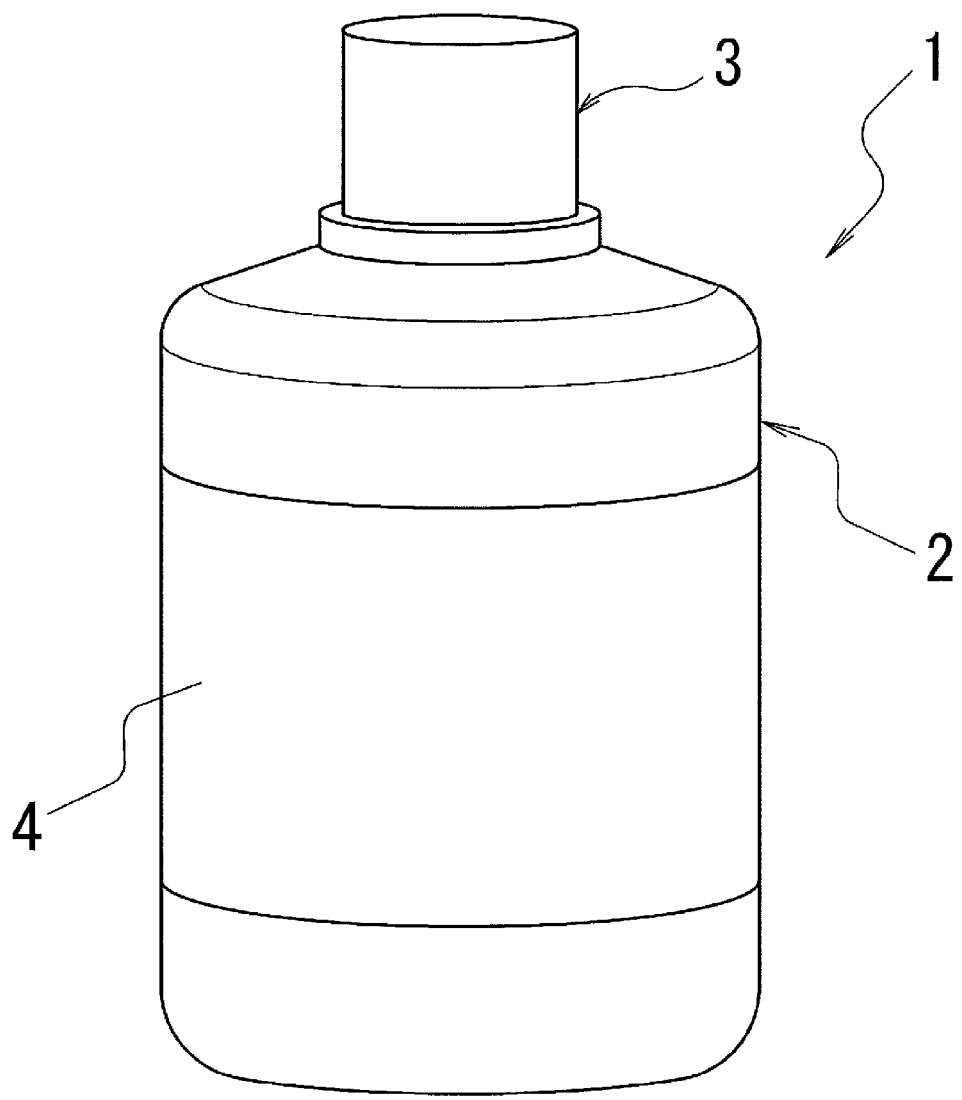
FIG. 1 is a perspective view illustrating a puncture repair liquid holding container according to an embodiment of the present technology.
Figure 2:
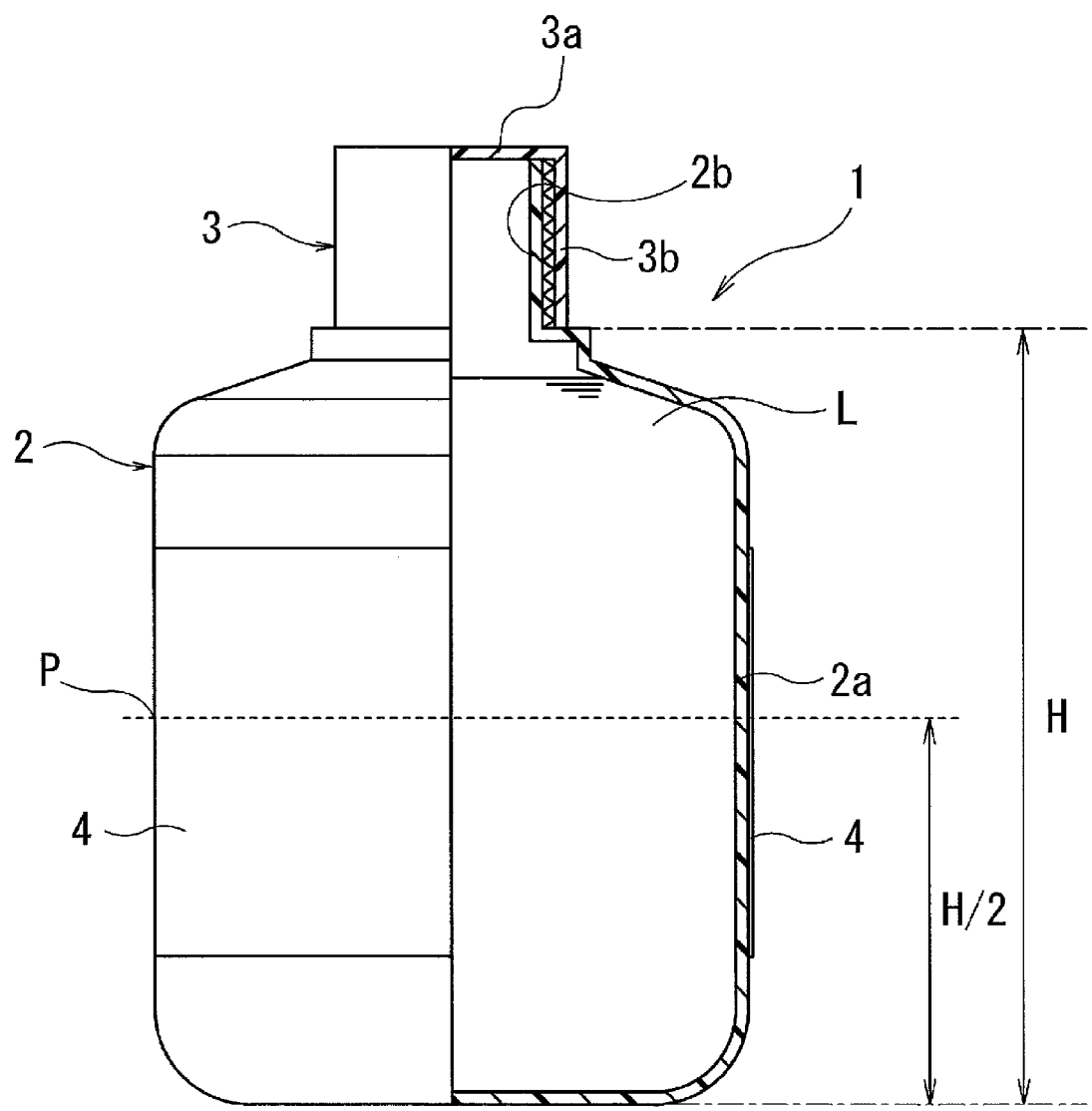
FIG. 2 is a partially cut-out frontal view of the puncture repair liquid holding container illustrated in FIG. 1.
Figure 3:
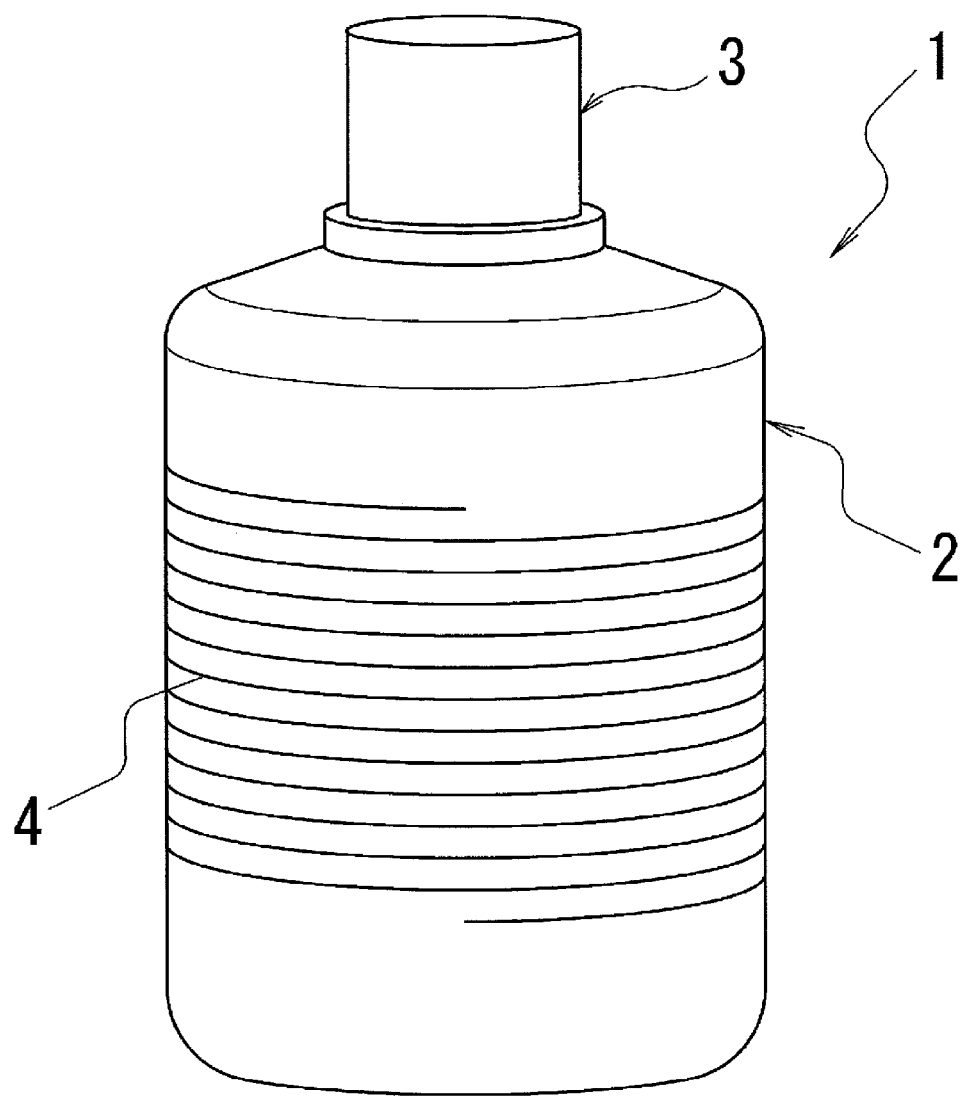
FIG. 3 is a perspective view illustrating a puncture repair liquid holding container according to another embodiment of the present technology.

A puncture repair liquid holding container 1 according to the present technology illustrated in FIGS. 1 and 2 includes a container main body 2 and a cap 3.

The container main body 2, as illustrated in FIGS. 1 and 2, includes a holding portion 2a and an opening 2b. The holding portion 2a has a cylindrical shape and holds a puncture repair liquid L that contains, for example, a rubber latex. The opening 2b has a cylindrical shape and is positioned on an upper side of the holding portion 2a when the container main body 2 is upright. The repair liquid L is dispensed through this opening 2b during use. When the container main body 2a is upright, the bottom surface of the holding portion 2a is positioned on the side opposite to the opening 2b. The opening 2b is, for example, sealed by a film (not illustrated), preventing the puncture repair liquid L in the container from deteriorating during non-use and from leaking from the container. In this embodiment, a screw thread is formed on an outer circumferential surface of the opening 2b so as to mate with a screw thread on the cap 3 side described later. The holding portion 2a and the opening 2b are integrally made of, for example, a synthetic resin such as polypropylene (PP) or high density polyethylene (HDPE).

The cap 3 includes, for example, a head portion 3a having a disc shape, and a side wall 3b that surrounds the outer circumference of this head portion 3a in a tubular shape, as illustrated in FIGS. 1 and 2. The side wall 3b is provided only to a surface on one side of the head portion 3a, and is provided with a screw thread that mates with the screw thread formed on the outer surface of the opening 2b described above on an inner surface thereof. The head portion 3a and the side wall 3b of the cap 3 are integrally made from a synthetic resin such as polypropylene. Note that the present technology relates to the holding portion 2a of the container main body 2 and a reinforcing member 4 provided in a periphery thereof as described later, and the structure of the cap 3 is not particularly limited. Thus, for ease of explanation, FIGS. 1 and 2 illustrate the cap 3 having a simple structure. This cap 3 protects the opening 2b of the container main body 2 during non-use, and is replaced with a cap (not illustrated) having a flow path or the like for guiding the puncture repair liquid when tire repair work is performed.

According to the present technology, the reinforcing member is provided around the periphery of the container main body 2 (holding portion 2a) as described later to reinforce the container main body 2 that is fed compressed air and increases in internal pressure when tire repair work is performed, and thus the basic structure is not limited to the form described above.

The puncture repair liquid holding container 1 of the present technology includes the container main body 2 and the cap 3 having the basic structure described above, as well as the reinforcing member 4 made of a material having a tensile elastic modulus per unit cross-sectional area that is greater than that of the material constituting the holding portion 2a. This reinforcing member 4, in the embodiment illustrated in FIGS. 1 and 2, is provided across the entire circumference of the holding portion 2a, over a portion of the holding portion 2a in a height direction.

With the reinforcing member 4 having a sufficient tensile elastic modulus thus provided around the periphery of the holding portion 2a, the holding portion 2a can be pressed from the periphery by the reinforcing member 4, even if the internal pressure increases by the compressed air fed in the container during tire repair work. With the holding portion 2a thus reinforced by the reinforcing member 4, the puncture repair liquid holding container 1 used in a pump-type puncture repair kit can maintain sufficient pressure resistance, even when the wall thickness of the holding portion 2a is made thinner than that in related art to achieve a reduction in weight and save resources. For example, while the wall thickness of the holding portion 2a according to the conventional puncture repair liquid holding container is set to about 2.5 mm to achieve sufficient pressure resistance that can stand up to practical usage. The holding portion 2a according the present technology can be reinforced by the reinforcing member 4, allowing the wall thickness to be thinner than that of related art.

Although the reinforcing member 4 need only be disposed over at least a portion of the holding portion 2a in the height direction, when the holding portion 2a has a cylindrical shape as illustrated, a vicinity of a center position P in the height direction of the holding portion 2a is structurally weak and readily breaks compared to a vicinity of the bottom surface of the holding portion 2a and the vicinity of the opening 2b (the vicinity of an inclined surface that extends to the opening 2b) Thus, the reinforcing member 4 is preferably disposed so as to cover a range of at least 60% of a height H of the holding portion 2a in the height direction of the holding portion 2a from the center position P in the height direction of the holding portion 2a. Such an arrangement can effectively reinforce the holding portion 2a, and thus is effective in maintaining pressure resistance. When the reinforcing member 4 is disposed in a position that deviates from this range, the portion of the holding portion 2a that is structurally weakest cannot be sufficiently reinforced, making it difficult to fully maintain pressure resistance.

The tensile elastic modulus per unit cross-sectional area of the material constituting the reinforcing member 4 is preferably at least 1.2 times the tensile elastic modulus per unit cross-sectional area of the material constituting the holding portion 2a, more preferably at least 1.5 times, and even more preferably at least 1.8 times. When the tensile elastic modulus per unit cross-sectional area of the material constituting the reinforcing member 4 is made sufficiently greater than the tensile elastic modulus per unit cross-sectional area of the material constituting the holding portion 2a, a superior pressure resistance from the reinforcing member 4 can be achieved, making such a configuration effective in decreasing the wall thickness of the holding portion 2a while achieving sufficient pressure resistance. At this time, when the tensile elastic modulus per unit cross-sectional area of the material constituting the reinforcing member 4 is less than 1.2 times the tensile elastic modulus per unit cross-sectional area of the material constituting the holding portion 2a, the holding portion 2a cannot be sufficiently pressed by the reinforcing member 4, making it difficult to achieve sufficient pressure resistance.

For example, the tensile elastic modulus per unit cross-sectional area of the material (polyethylene) constituting the holding portion 2a is about from 1000 to 1600 MPa, and therefore the tensile elastic modulus per unit cross-sectional area of the material constituting the reinforcing member 4 is preferably from 1200 to 2400 MPa, and more preferably within a range of from 1500 to 1900 MPa. Further, for example, when the tensile elastic modulus per unit cross-sectional area of the reinforcing member 4 is set to 1200 MPa (1.2×) with respect to the holding portion 2a made from polyethylene having a tensile elastic modulus per unit cross-sectional area of 1000 MPa, about the same pressure resistance as that in related art (a wall thickness of 2.5 mm, without a reinforcing member) can be achieved, even with a wall thickness of about 2 mm. That is, when the tensile elastic modulus per unit cross-sectional area of the material constituting the reinforcing member 4 is at least 1.2 times the tensile elastic modulus per unit cross-sectional area of the material constituting the holding portion 2a, a container having a pressure resistance superior to that of related art at a wall thickness less than or equal to that of related art can be obtained.

Although the reinforcing member 4 can be made using any material as long as the material satisfies the relationship of tensile elastic modulus per unit cross-sectional area described above, a material such as a metal, a string, a fabric, paper, or a resin, may be used because the container main body 2 (holding portion 2a) is made from polypropylene (PP) or a high density polyethylene (HDPE) as described above and, with such a resin, suppressing an initial extension is effective in increasing pressure resistance.

When, a metal is used among these materials, and the reinforcing member 4 is a structure made from a metal, the weight of the reinforcing member 4 is large even when the thickness of the container main body 2 is decreased, making it difficult to achieve weight reduction. Thus, when the reinforcing member 4 is made from a metal, use of a metal deposited film (an aluminum deposited film, for example) obtained by depositing a metal on paper or a resin film is preferred.

When, a string is used among these materials, a plurality of the reinforcing members 4 made from string may be wound around the periphery of the holding portion 2a in a spiral-like manner. Further, the simply wound string may become untied from the wound end portion, and thus a label that covers the entire section where the string is wound may be adhered from on top of the string. In this case, a reinforcement effect from the label is also achieved, resulting in a superior pressure resistance.

When, a resin is used among these materials, a resin film stretched in at least the circumferential direction of the holding portion 2a may be used. Such a resin film is inexpensive and exhibits sufficient reinforcing performance (a tensile elastic modulus greater than that of the holding portion 2a), allowing preferable use as the reinforcing member 4.

Figure 4:
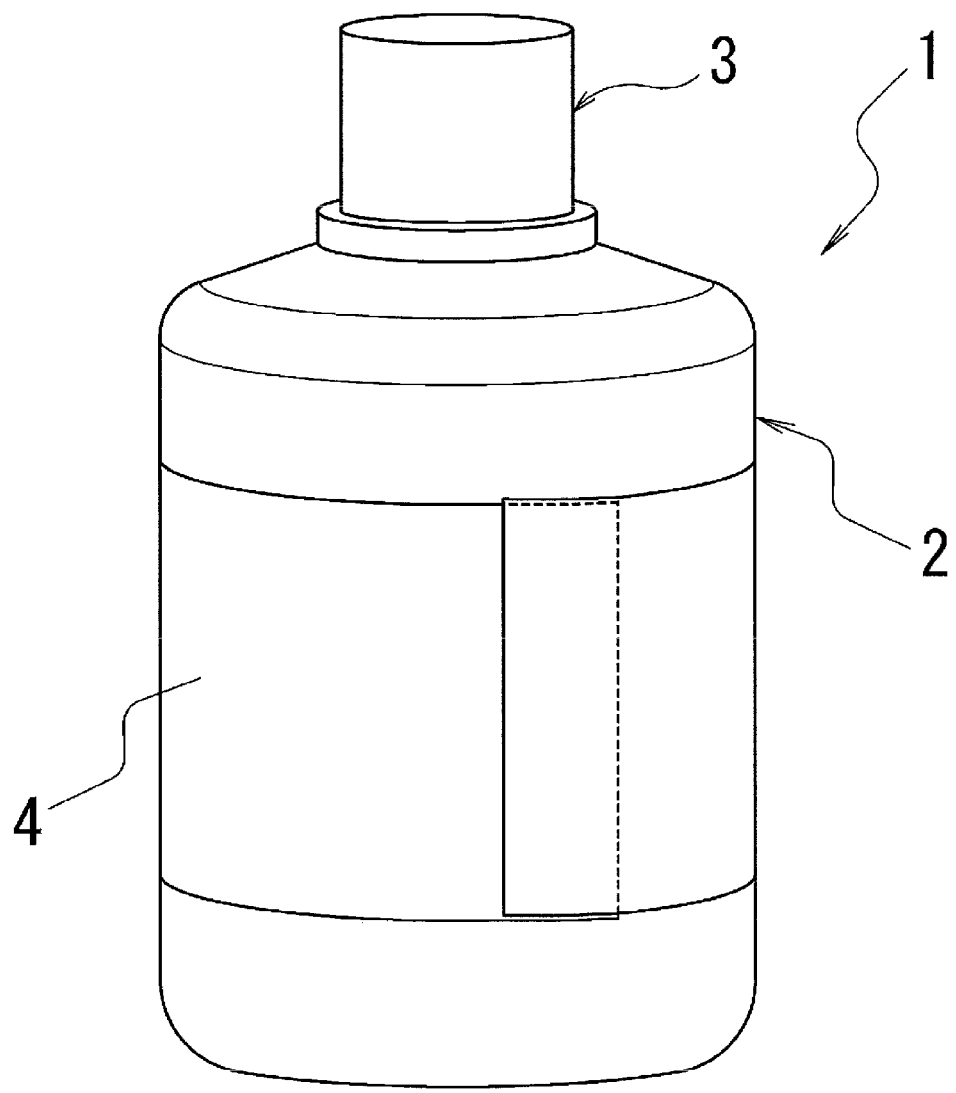
FIG. 4 is a perspective view illustrating a puncture repair liquid holding container according to another embodiment of the present technology.

Although the reinforcing member 4 is preferably formed using the materials described above from a material perspective, the reinforcing member 4 may have a sheet shape from a structural perspective. The reinforcing member 4 having this sheet shape is preferably wound at least once around the entire circumference of the holding portion 2a and adhered by an adhesive with both end portions overlapping each other, as illustrated in FIG. 4. According to such a configuration, the reinforcing member 4 is easy to install and, with both end portions overlapping, superior reinforcing performance can be achieved. Further, according to such a configuration, the reinforcing member 4 has a sheet shape, making it possible to make the reinforcing member 4 concurrently serve as a label that displays puncture repair liquid information and the method of use. In this case, in consideration of concurrent use with the materials described above, preferably paper, a resin (the resin film described above), or a metal (the metal deposited film described above) is wound around the entire circumference of the holding portion 2a as described above and adhered by an adhesive with both end portions overlapping each other.

Note that, in this case, the adhesive is preferably applied at least between both end portions overlapping each other. That is, as long as the adhesive is applied to this position, the both end portions overlapping each other are adhered, causing the reinforcing member 4 having a sheet shape to form an annular shape compatible with the outer circumference of the holding portion 2a. This makes it possible to attach the reinforcing member 4 in a predetermined position of the holding portion 2a without adherence of the reinforcing member 4 itself to the holding portion 2a. Of course, as long as the adhesive is applied to the entire surface of the reinforcing member 4 having a sheet shape, the reinforcing member 4 can be reliably attached in a predetermined position of the holding portion 2a. Such a configuration is effect in achieving a desired reinforcing performance (pressure resistance).

The reinforcing member 4 may be also formed in an annular shape in advance, and the reinforcing member 4 having this annular shape may be disposed so as to surround the holding portion 2a. With such a configuration, it is possible to press the holding portion 2a from the periphery by the structure formed in advance into an annular shape, making it possible to achieve a superior reinforcing performance against internal pressure. In this case, in consideration of concurrent use with the materials described above, preferably a resin, for example, is used to form the reinforcing member 4 into an annular shape in advance.

Figure 5:
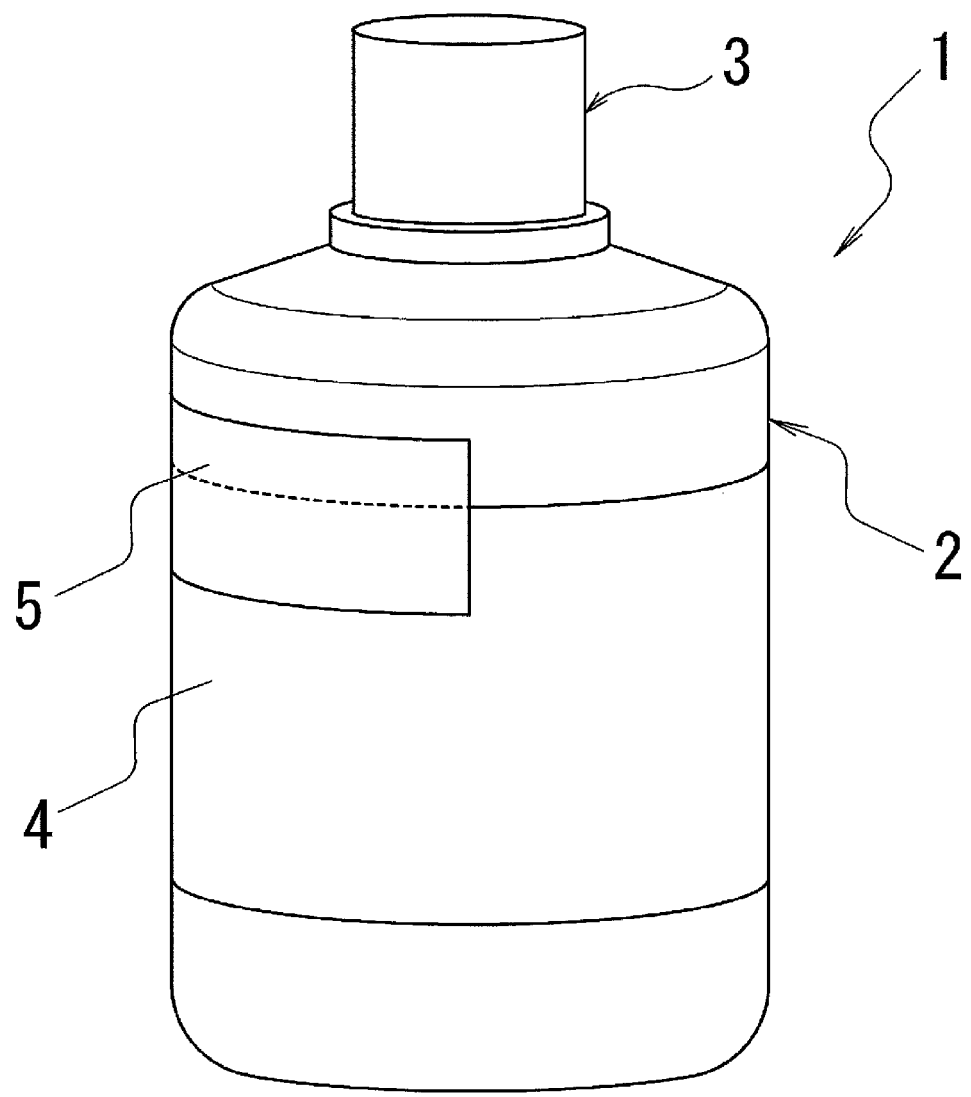
FIG. 5 is a perspective view illustrating a puncture repair liquid holding container according to another embodiment of the present technology.

At this time, the reinforcing member 4 having an annular shape is mounted on the holding portion 2a by the holding portion 2a being inserted inward of the reinforcing member 4, facilitating movement in the height direction of the holding portion 2a (direction of insertion of the holding portion 2a). Thus, the reinforcing member 4 having an annular shape is preferably fixed after insertion, and thus an adhesive label 5 adhered so as to extend across at least a portion of the reinforcing member 4 having an annular shape and at least a portion of an outer surface of the holding portion 2a is preferably provided, as illustrated in FIG. 5. With use of such a label 5, the reinforcing member 4 can be reliably installed in a predetermined position using a simple structure of label adherence. Further, according to such a configuration, the adhesive label 5 may concurrently serve as a label that displays puncture repair liquid information and the method of use.

The invention claimed is:

1. A puncture repair liquid holding container, comprising:
a container main body provided with a holding portion that holds a puncture repair liquid and an opening, the holding portion being formed of a material selected from polyethylene or polypropylene;
a cap mounted on the opening; and
a reinforcing member made from a material having a tensile elastic modulus per unit cross-sectional area at least 1.2 times a tensile elastic modulus per unit cross-sectional area of a material constituting the holding portion, the tensile elastic modulus per unit cross-sectional area of the reinforcing member being from 1650 to 2400 MPa;

the reinforcing member being disposed around an entire circumference of the holding portion over at least a portion of the holding portion in a height direction.

2. The puncture repair liquid holding container according to claim 1, wherein the holding portion has a cylindrical shape; and the reinforcing member is disposed so as to cover a range of at least 60% of a height of the holding portion in the height direction of the holding portion from a center position in the height direction of the holding portion.

3. The puncture repair liquid holding container according to claim 2, wherein the reinforcing member has a sheet shape, and the reinforcing member having the sheet shape is wound around the entire circumference of the holding portion and adhered by an adhesive with both end portions overlapping each other.

4. The puncture repair liquid holding container according to claim 2, wherein the reinforcing member has an annular shape, and the reinforcing member having the annular shape is disposed so as to surround the holding portion.

5. The puncture repair liquid holding container according to claim 4, further comprising an adhesive label adhered so as to extend across at least a portion of the reinforcing member having the annular shape and at least a portion of an outer surface of the holding portion.

6. The puncture repair liquid holding container according to claim 5, wherein the reinforcing member is a resin film stretched at least in a circumferential direction of the holding portion.

7. The puncture repair liquid holding container according to claim 1, wherein the reinforcing member has a sheet shape, and the reinforcing member having the sheet shape is wound around the entire circumference of the holding portion and adhered by an adhesive with both end portions overlapping each other.

8. The puncture repair liquid holding container according to claim 1, wherein the reinforcing member has an annular shape, and the reinforcing member having the annular shape is disposed so as to surround the holding portion.

9. The puncture repair liquid holding container according to claim 8, further comprising an adhesive label adhered so as to extend across at least a portion of the reinforcing member having the annular shape and at least a portion of an outer surface of the holding portion.

10. The puncture repair liquid holding container according to claim 1, wherein the reinforcing member is a resin film stretched at least in a circumferential direction of the holding portion.

11. The puncture repair liquid holding container according to claim 1, wherein the reinforcing member is wound at least twice around the holding portion.

* * * * *